(12) United States Patent
Haukijärvi et al.

(10) Patent No.: US 7,760,966 B2
(45) Date of Patent: Jul. 20, 2010

(54) METHOD AND APPARATUS FOR DOWNSCALING A DIGITAL COLOUR MATRIX IMAGE

(75) Inventors: Mikko Haukijärvi, Tampere (FI); Ossi Kalevo, Toijala (FI)

(73) Assignee: Nokia Corporation, Espoo (FI)

(*) Notice: Subject to any disclaimer, the term of this patent is extended or adjusted under 35 U.S.C. 154(b) by 975 days.

(21) Appl. No.: 10/593,127

(22) PCT Filed: Apr. 29, 2005

(86) PCT No.: PCT/FI2005/050139
§ 371 (c)(1),
(2), (4) Date: Sep. 14, 2006

(87) PCT Pub. No.: WO2005/106787
PCT Pub. Date: Nov. 10, 2005

(65) Prior Publication Data
US 2007/0230827 A1 Oct. 4, 2007

(30) Foreign Application Priority Data
Apr. 29, 2004 (FI) .................................. 20045157

(51) Int. Cl.
*G06K 9/32* (2006.01)
*G06K 9/00* (2006.01)
*G06K 9/34* (2006.01)

(52) U.S. Cl. ........................................ 382/298; 382/167

(58) Field of Classification Search .................. 382/162, 382/164, 165, 167, 173, 218–220, 260–264, 382/298–300; 348/221.1, 273, 441, 561, 348/564, 565, 580, 581; 345/439, 606, 616, 345/660, 667; 358/451, 512, 525
See application file for complete search history.

(56) References Cited

U.S. PATENT DOCUMENTS

| 5,790,714 | A | 8/1998 | McNeil et al. | 382/300 |
| 6,091,426 | A | 7/2000 | Hauck et al. | 345/439 |
| 6,205,245 | B1 * | 3/2001 | Yuan et al. | 382/162 |
| 6,236,433 | B1 * | 5/2001 | Acharya et al. | 348/273 |

(Continued)

FOREIGN PATENT DOCUMENTS

| EP | 0 561 417 A1 | 9/1993 |
| EP | 0 597 793 A2 | 5/1994 |

OTHER PUBLICATIONS

Kim, Chun-Ho et al., "Winscale: An Image-Scaling Algorithm Using an Area Pixel Model", IEEE Transactions on Circuits and Systems for Video Technology, vol. 13, No. 6, Jun. 2003.

*Primary Examiner*—Amir Alavi
(74) *Attorney, Agent, or Firm*—Harrington & Smith

(57) ABSTRACT

Embodiments of the invention include a method and apparatus for downscaling a digital matrix image by selected ratios. According to embodiments, the value of each output pixel of the output matrix is calculated from the values of the input pixels. The output pixels (k,l) are processed in such a way that the weighted sum of the values of the pixels (i,j) of the matrix image in the area of each output pixel (k,l) is formed, the weighting coefficient being the dimension share of the pixel (i,j) in the area of the output pixel (k,l) and each weighted sum is corrected by a scaling factor ($f \times M_2/M_1 \times N_2/N_1$).

20 Claims, 12 Drawing Sheets

U.S. PATENT DOCUMENTS

| | | |
|---|---|---|
| 6,252,577 B1 * | 6/2001 | Rashkovskiy et al. ........ 345/670 |
| 6,317,164 B1 * | 11/2001 | Hrusecky et al. ............ 348/581 |
| 6,580,837 B1 * | 6/2003 | Johnson ...................... 382/300 |
| 6,714,692 B1 | 3/2004 | Kim et al. ................... 382/299 |
| 7,116,841 B2 * | 10/2006 | Wright ....................... 382/298 |
| 7,154,514 B2 * | 12/2006 | Chang et al. ................ 345/667 |
| 2001/0048772 A1 | 12/2001 | Carney et al. ............... 382/298 |
| 2003/0044088 A1 | 3/2003 | Wright ....................... 382/300 |
| 2004/0165080 A1 | 8/2004 | Burks et al. ............... 348/222.1 |
| 2005/0088560 A1 * | 4/2005 | Kalevo .................. 348/333.01 |
| 2007/0133902 A1 * | 6/2007 | Kumar ....................... 382/298 |
| 2007/0230827 A1 * | 10/2007 | Haukijarvi et al. .......... 382/298 |
| 2008/0075354 A1 * | 3/2008 | Kalevo ....................... 382/149 |

* cited by examiner

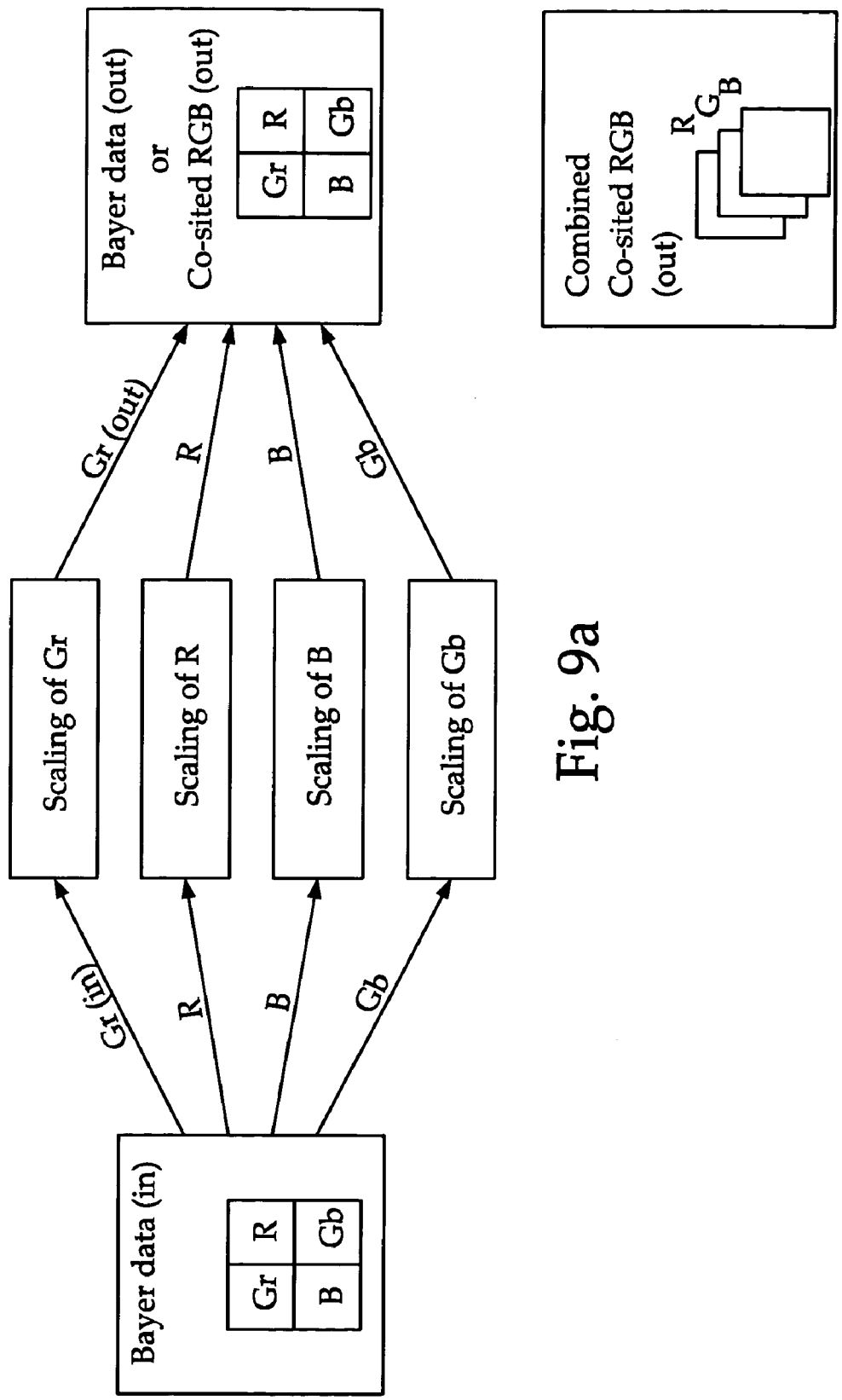

METHOD AND APPARATUS FOR DOWNSCALING A DIGITAL COLOUR MATRIX IMAGE

"This Application is a 371 of PCT/FI05/50139 filed on Apr. 29, 2005".

TECHNICAL FIELD

The present invention relates to a method and apparatus for downscaling a digital coloured matrix image by selected ratios $M_2/M_1$ and $N_2/N_1$, in which the matrix image includes $N_1$ rows, each row including $M_1$ pixels, so that the intensity values of the pixels form the matrix and the pixels of different colours form a selected format, and in which scaling is used to form an output matrix, of a size $M_2 \times N_2$, the pixels corresponding to sub-groups of the original matrix, in such a way that $M_2 <= M_1$ and $N_2 <= N_1$, and from the intensity values of which pixels the value of each output pixel of the output matrix is calculated.

BACKGROUND INFORMATION

Camera sensors are used when using digital cameras to take individual images or a video image. The sensor image can use various image formats, for example RGB8:8:8, is RGB5:6:5, YUV4:2:0, and a raw-Bayer image. When the image is displayed in the view-finder (VF), which usually has a lower resolution than the image sensor, the image must be formed in the sensor and scaled to a suitable resolution for the display. Images can also be zoomed (a smaller image is delimited from the image and then scaled) to the viewfinder. In zooming, there must be many steps from the full image size towards the larger zooming, so that the result of the zooming will appear to be continuous. When video images are coded, the resolution of the video image is also usually lower than the resolution of the sensor. Thus a similar scaling is also required for video. Camera sensors can also be used equally well in portable devices as in cameras.

Image scaling or modifying the size of digital images has been exploited in several digital image-processing applications. The basic method in image scaling is to arrange a two-dimensionally sampled signal in a new sampling array.

A few possibilities for carrying out image sub-sampling are known from the literature on signal and image processing. The sampling of the signal is essential part in the theory of signal processing and has been widely covered in the literature. Basically, it is a matter of preserving the spectrum of the image below Nyquist frequency.

The general sub-sampling methods include an anti-alias filter and the re-creation of the image from the samples. The sampled data is often got using a linear combination of sampled input data and a specific core.

Sampling algorithms are often compromises between the complexity of the algorithm and the quality of the image obtained.

The simplest form of re-sampling is the 'nearest neighbourhood' method. This does not use anti-alias filtering of the original data, but only selects the nearest samples for the new sampling array. The image obtained as a result is thus poor, due to the anti-aliasing effect.

There are many methods for selecting the coefficients for the core of the anti-alias filter.

U.S. Pat. No. 6,205,245 discloses one method, in which a colour image is scaled directly from the sensor's matrix, in such a way that a pixel group, of which one is always processed one at a time, and which corresponds to each pixel of the final image, is defined. In this method, intermediate pixels are jumped over, thus losing original information.

SUMMARY

The present invention is intended to create a new high-quality sub-sampling method and an apparatus requiring small amount of memory for implementing the method. According to an embodiment of the invention, disclosed is a method for downscaling a digital coloured matrix image by selected ratios $M_2/M_1$ and $N_2/N_1$, in which the matrix image includes $N_1$ rows each row including $M_1$ pixels, so that the values of the pixels form the matrix and the pixels of different colours form the selected format, and in which scaling is used to form an output matrix, of a size $M_2 \times N_2$, the pixels corresponding to sub-groups of the original matrix, in such a way that $M_2 <= M_1$ and $N_1 <= N_1$, and from the values Input (j,i) of which pixels (i,j) the value Output (l,k) of each output pixel (k,l) of the output matrix is calculated. The coloured matrix image is read only once and the weighted sums of the values of the same-colour pixels (i,j) of the matrix image in the area of each output pixel (k,l) is formed parallel in line memories (Buffer[0], Buffer[1]) arranged for each colour, the weighting coefficient being the dimension share of the pixel (i,j) in the area of the output pixel (k,l) and each weighted sum is corrected by a scaling factor $(f \times M_2/M_1 \times N_2/N_1)$.

According to another embodiment of the invention, disclosed is an apparatus for downscaling a digital coloured matrix image by selected ($M_2/M_1$ and $N_2/N_1$). The apparatus includes an application memory for storing and processing the scaled matrix image, a central processing unit (CPU), a program memory area and a program stored into for performing the processing. The matrix image includes $N_1$ rows, each row including $M_1$ pixels, so that the values of the pixels form the matrix and the pixels of different colours form the format, and in which the pixels of the output matrix, of a size $M_2 \times N_2$, formed by the scaling, correspond to sub-groups of the original matrix, from the values of which pixels the mean value of each pixel of the output matrix is calculated by calculating the sum of the values and dividing it by the scaling factor $(M_2/M_1 \times N_2/N_1)$. The apparatus is arranged to read the coloured matrix image only once and to process the input pixels (k.l) individually, in such a way that the said sum of the values is formed parallel in line memories (Buffer[0], Buffer[1]) arranged for each colour weighted from the values of the same-colour matrix-image pixels (i,j) in the area of each output pixel (k,l), the weighting coefficient being the dimension proportion of the pixel (i,j) in the area of the output pixel (k,l).

According to a further embodiment of the invention, disclosed is a method for downscaling a digital matrix image, by means of software, by selected ratios $M_2/M_1$ and $N_2/N_1$, in a digital device, in which there is a scaling component including at least an input unit for bringing the input rows to the scaling component, a processor and memory for processing the data, and an output part from forwarding the processed data. The matrix image includes $N_1$ rows, each row including $M_1$ pixels, so that the values of the pixels form the matrix and the pixels of different colours form the selected format, and in which the pixels of the output matrix, of a size $M_2 \times N_2$, formed by scaling, correspond to the sub-groups of the original matrix, in such way that $M_2 < M_1$ and $N_2 < N_1$, and from the values Input (j,i) of which pixels (i,j) the value Output (l,k) is calculated for each output pixel (k,l) of the output matrix. The coloured matrix image is read only once so that each input row is brought in turn, and each pixel is taken individually to the processor for processing. The weighting coefficient for each pixel is calculated in the area of the output pixel, the weighting coefficient depicting the part of the surface area of the pixel in the output pixel. The values of the pixels of the input row are summed in the area of each output pixel (k,l) according to a predefined sequence, in such a way that a weighted sum is formed parallel in line memories (Buffer[0], Buffer[1]) arranged for each colour and each sum is formed of the values of the same-colour matrix-image pixels (i,j) in the area of each output pixel (k,l), and each weighted sum is corrected by a scaling factor ($M_2/M_1 \times N_2/N_1$). The corrected sum is transferred out through the output part.

The use of the method according to the invention requires only small amount of memory and the method is efficient in terms of calculation. The quality of the output image is, however, high. The method is particularly suitable for low-power devices such as cameras, as well as for camera and multimedia communicators. The small memory requirement is due to the fact that, in the scaling, one input image row, i.e. line, which is stored by summing only the amount of a single output line (row) into the line memory, as well as storing in a second line memory that part of the input image line, which is not contained in the output image pixel being processed. In one application, the pair of memories are alternated automatically by addressing the modulo of the index of the output row with the modulo 2-function, i.e. with the least significant bit of the integer (index). In one application, the memory required in scaling is implemented in the processor (CPU) performing the scaling. This can be a separate DSP (digital signal processor)-circuit component. One example of DSP processor architecture, which can be applied in context with the invention, is the multiprocessor ADSP-BF561 manufactured by the Analog Device Inc. (USA) corporation. A second example referred to here is the RISC processor ARM9EJ-S (product specification: ARM DDI 0222B) of ARM Ltd., UK. In several two-processor applications, the processors are, however, located physically in different circuits/modules.

BRIEF DESCRIPTION OF THE DRAWINGS

In the following, the invention is examined with reference to the accompanying figures, which show the method and apparatus of the invention.

FIG. 9*a* shows the scaling stages of the raw-Bayer image format

FIG. 9*b* shows, as an alternative output form to that of FIG. 9*a*, combined co-sited RGB.

DETAILED DESCRIPTION

Figure 1:
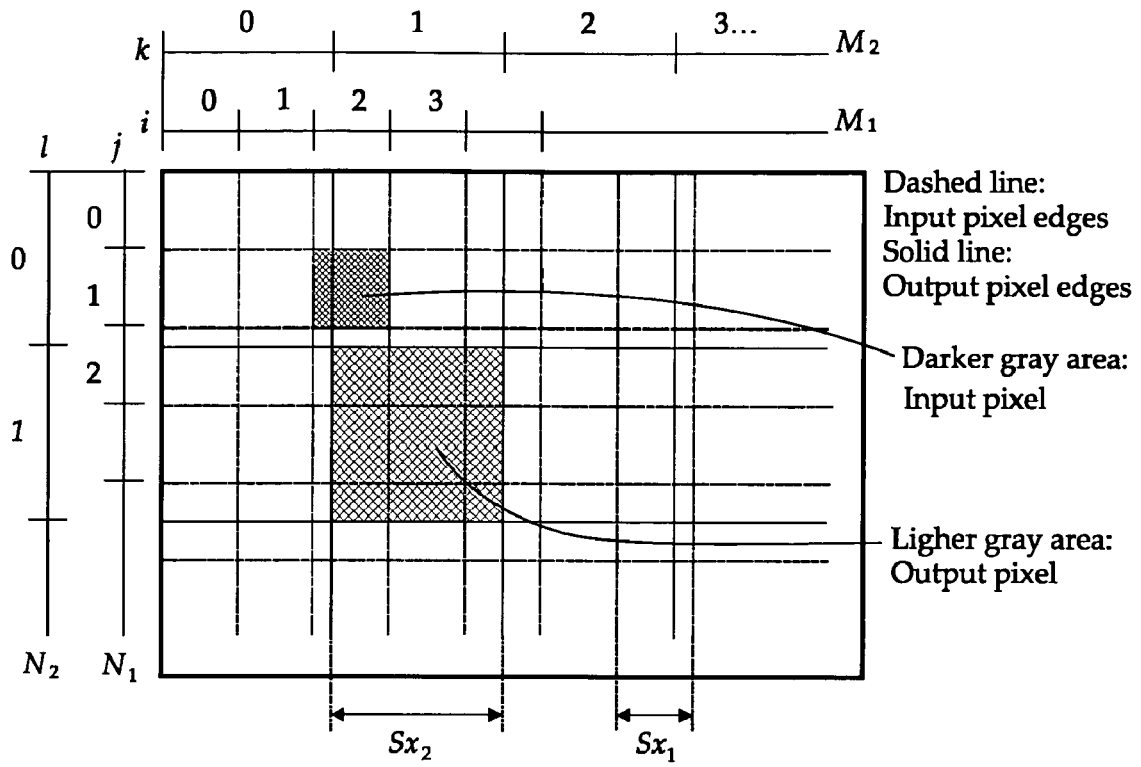
FIG. 1 shows the scaling concepts

According to FIG. 1, the input image ($I_1$) and the output matrix ($I_2$) are placed on top of each other, so that each pixel of the output matrix is influenced by the original pixels. Scaling is a process, in which an output image with a lower resolution is formed from the input image. In order to simplify the depiction, FIGS. 1-5 mainly deal with the scaling of a black-and-white image. The special features of scaling a coloured image will become apparent later.

The image sizes are $I_1$: $M_1 \times N_1$ and $I_2$: $M_2 \times N_2$. The pixels are regarded more as areas than as points. The pixel sizes are set as $Sx_1 \times Sy_1$ for the input image and $Sx_2 \times Sy_2$ for the output image. The image size is defined as L 'units', so that $L = Sx_1 M_1 = Sx_2 M_2 =$ (pixel size)×(number of pixels), so that $Sx_1/Sx_2 = M_2/M_1 = c \times M_2/c \times M_1$.

The pixel sizes are then calculated as follows:

$$Sx_1 = c \times M_2, \text{ and}$$

$$Sx_2 = c \times M_1,$$

c can be chosen freely: for example, c=1, or c=1/gcf ($M_1$, $M_2$) (gcf: greatest common factor), or c=1/$M_1$, or any c>0. It is useful to choose the coefficient c in such a way that $Sx_2$ is the power of two (1, 2, 4, ... ), because divisions by $Sx_2$ can then be easily performed in binary calculation (i.e. division becomes a transfer in binary integer calculation). The pixel indices are marked as follows: (i=0, 1, ... , ($M_1$-1), j=0, ... , ($N_1$-1), k=0, ... , ($M_2$-1) and l=0, ... , ($N_2$-1).

The value of the output pixel is the weighted mean value of the values of the input pixels that 'belong' to the area of the output pixel, FIG. 1.

$$Out(k,l) \left\{ \sum_{(i,j) \in Out(k,l)} W(i,j) In(i,j) \right\} / ScaleFactor$$

The scaling factor ScaleFactor is calculated as follows:

$$ScaleFactor = \sum_{(i,j) \in Out(k,l)} W(i,j) = \frac{Sx_2}{Sx_1} \cdot \frac{Sy_2}{Sy_1} = \frac{M_1}{M_2} \cdot \frac{N_1}{N_2}$$

W(i,j) is the weighting coefficient. It is relative, depending on how many input pixels there are inside an output pixel:

W(i,j)=the surface area covered by the output pixel (k,l) inside (i, j)/the surface area of the input pixel (i,j).

Figure 2:
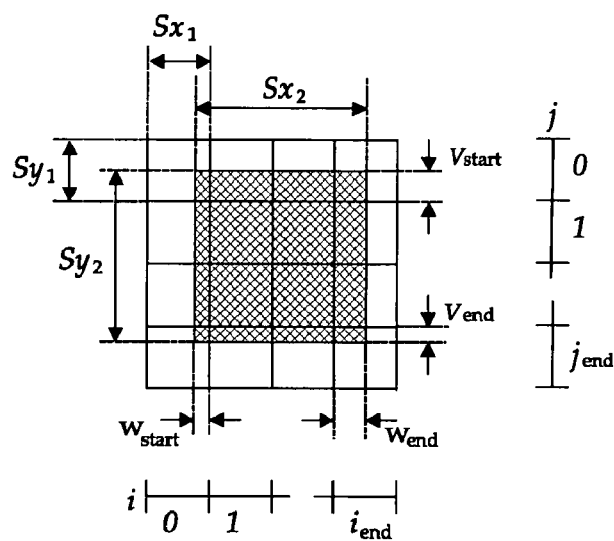
FIG. 2 shows an example of an output pixel
Figure 3:
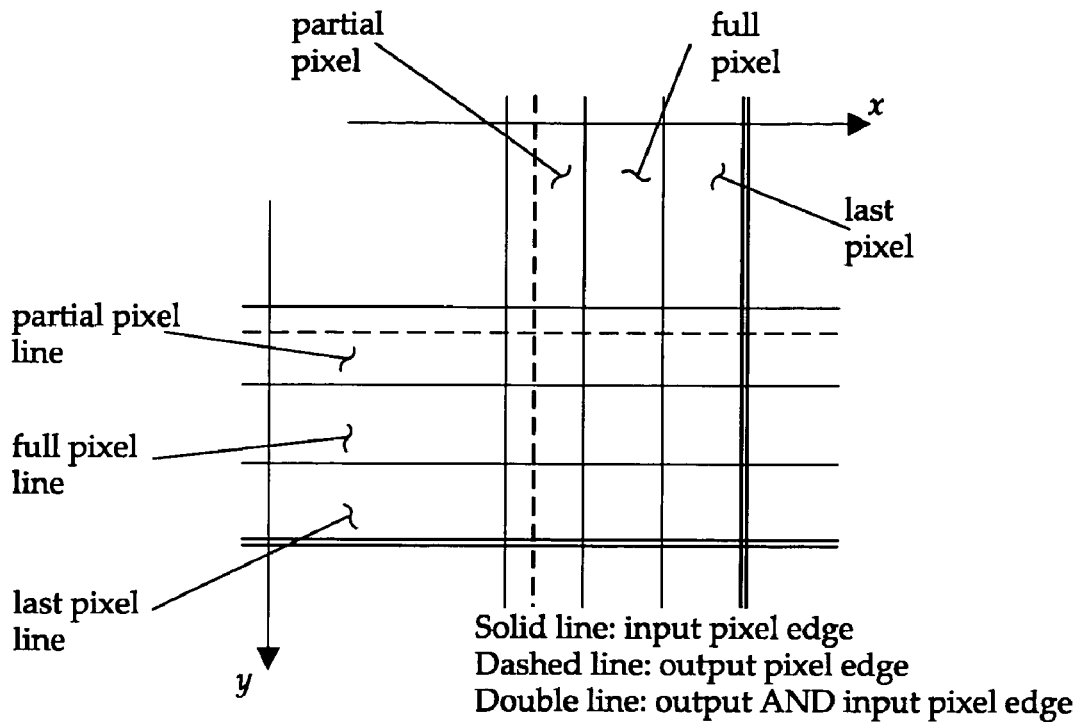
FIG. 3 shows a depiction of different types of pixels

FIG. 2 shows an example of this. The output pixel covers the input pixels: j=0 ... $j_{end}$, and i=0 ... $i_{end}$. The indices (i=0,j=0) are used to depict the input pixels that initiate an arbitrary output pixel. Some weighting coefficients:

$$W(0,0) = (v_{start} \times w_{start})/(Sy_1 \times Sx_1)$$

$$W(1,1) = 1$$

$$W(1,0) = V_{start}/Sy_1 \ldots \text{etc.}$$

The following describes the application of the scaling method.

In order to calculate the output pixel value, it is possible to use separate processing, i.e. the x direction can be calculated first, followed by the y direction:

$$Outx(j) = [w_{start}/Sx_1 \times \ln(0,j) + Sum(\ln(1,j) \ldots \ln(i_{end-1}, j)) + w_{end}/Sx_1 \times \ln(i_{end},j)] \times Sx_1/Sx_2 = [w_{start} \times \ln(0,j) + Sx_1 \times Sum(\ln(1,j) \ldots \ln(i_{end-1},j)) + w_{end} \times \ln(i_{end},j)]/Sx_2.$$

$$Out = [v_{start}/Sy_1 \times Outx(0) + Sum(Outx(1) \ldots Outx(j_{end-1})) + v_{end}/Sy_1 \times Outx(j_{end})] \times Sy_1/Sy_2 = [v_{start} \times Outx(0) + Sy_1 \times Sum(Outx(1) \ldots Outx(j_{end-1})) + v_{end} \times Outx(j_{end})]/Sy_2.$$

This algorithm is based on online processing. One input pixel is processed at a time. The pixel data is summed in the line-memory structure. The weighting coefficients acting on the various indices can be calculated ready in one line memory (preferably the input line memory) in, connection with processing, thus further reducing the number of calculation operations. The price for this is, of course, a slight increase in memory, but this is repaid in the form of saved operations. Of course, two line memories will be required, if the vertical and horizontal scaling coefficients are different. When the coefficients are equal, only one (longer) line memory will be required.

The input pixels have a different coefficient, depending on where they are located relative to the output pixel. Thus, there are three types of pixel, see FIG. 3.

Full pixel/full pixel row: the input pixel is entirely inside the output pixel.

Final pixel/final pixel row: the input and output pixels have a common end edge.

Part pixel/part pixel row: the area of the input pixel extends to the area of two or four output pixels.

Figure 4:
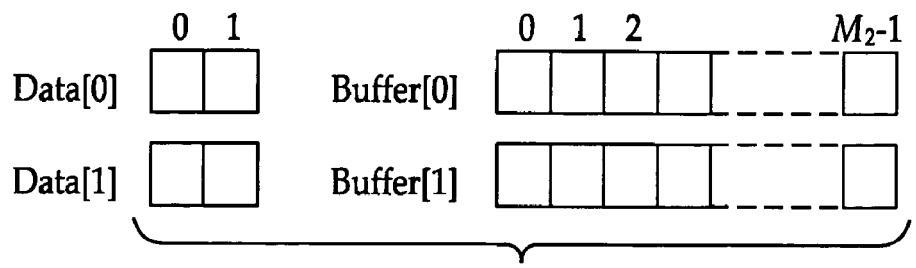
FIG. 4 shows the structure of the memory required in the method

The memory structure is shown in FIG. 4. It includes two parts, termed 'Data' and 'Buffer'. The data structure includes four memory locations (Data[0/1][0/1]). The row memory structure includes two line memories (Buffer[0][0 ... $M_2$-1], Buffer[1][0 ... $M_2$-1]). The length of the line memories is the width of the output image. Separate memories will always be required for the different colour components when the image is not read many times from one of the large memories and processed only one component at a time. In the case of a Bayer image, both Gr and Gb are processed as their own colour components and thus require their own memories.

Because the sub-sampling method can be separated into parts, it is always possible to carry out vertical and horizontal scaling in separate processors (for example, in the camera sensor and the base-band processor). One-dimensional scaling does not require a line-memory at all, if the scaling takes place in the direction in which the pixels come into scaling (generally in the horizontal direction). Only a data structure, such as DATA[0/1] is needed, when one-directional sub-sampling should be carried out. This data structure is required on rows or columns including all colour components.

Depending on the type of pixel in question, the DATA and line-memory locations are filled. The relation of the pixel position to the output pixel (k, l) also determines how the memory structure is used (see the pseudocode later).

On the part-pixel line, both line memories Buffer[0][0 ... $M_2$-1] and Buffer[1][0 ... $M_2$-1] are in use. This means that the start of the following output line has already been processed. In the part-pixel area, the data structures Data[a][0] and Data[a][1] are summed, in which a can be 0 or 1 (full pixel row), or both 0 and 1 (part pixel row).

Figure 5A:
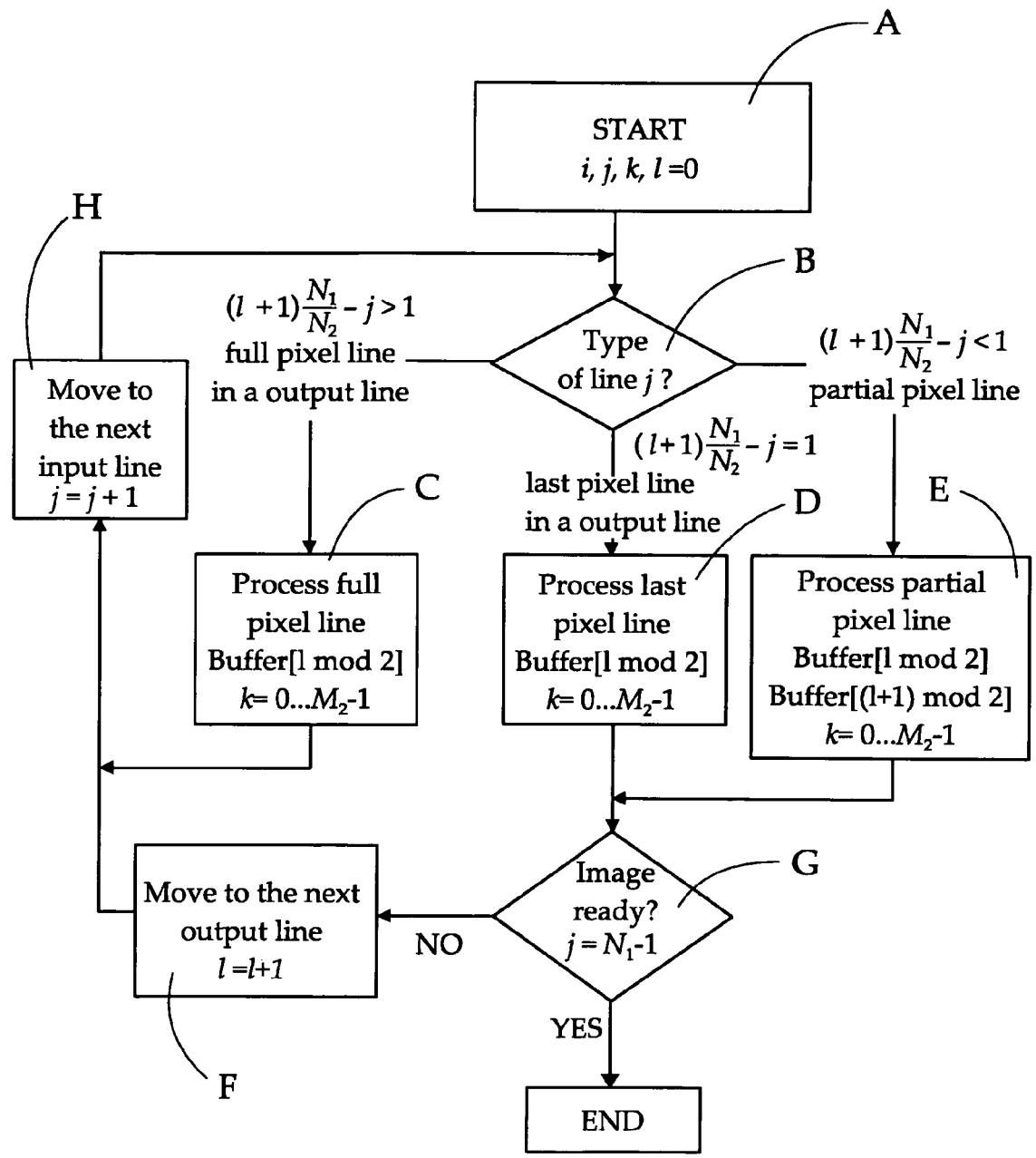
FIG. 5*a* shows the scaling algorithm as a flow diagram

FIG. 5a shows a flow diagram of the algorithm. We start from the first input row and from the first output row (i,j,k,l=0, stage A). The type of pixel row is derived from the location of the input, stage B. The input row is processes according to its type (Stage C, D, or E). After the processing of the row, the next row always comes for processing, until all the rows have been processed. The part pixel row stage E, or the final (full) pixel row on the output row, stage D, terminate the output row. After a full row and a part pixel row, the next output row (l+1) is taken for processing, until the row that was processed was the last one (j=$N_1$-1), condition G, in which case the scaled image is ready. After this condition, the process either terminates or moves to the following output row, stage F. At the same time, the process moves to the processing of the following input row j=j+1), stage H, which is reached also from the processing of the full row in the middle of the output row, stage C.

Figure 5B:
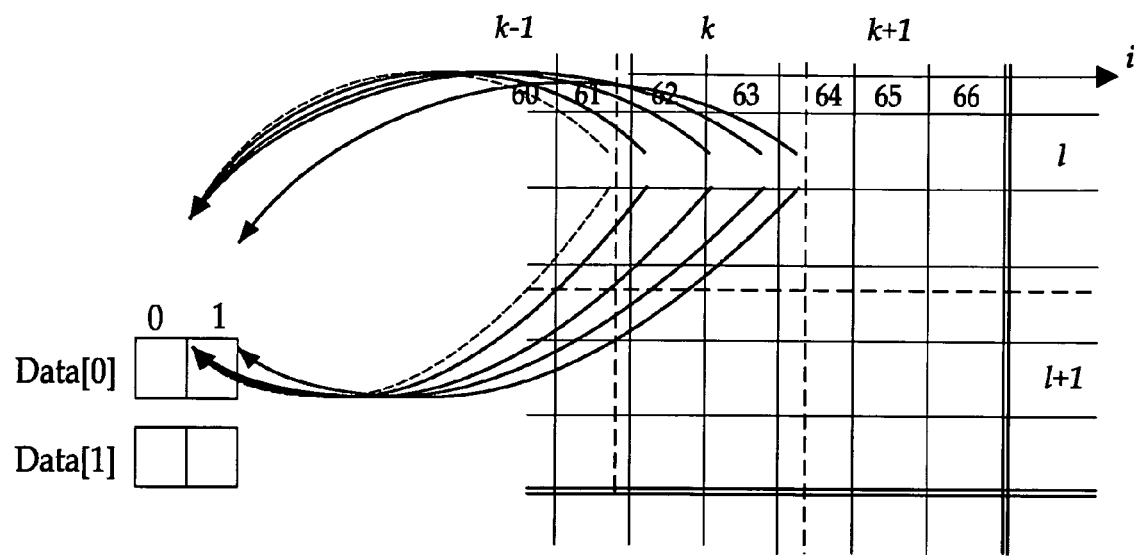
FIG. 5*b* shows the use of DATA memory locations in a most difficult case

FIG. 5b illustrates the operation of the DATA memory locations in a most difficult case, i.e. in the case of a part pixel row. In this figure, the value of the output pixel of column k on row l is processed and in this case the input-image pixels l from 61-64 are used in the processing. The even-numbered indices (modulo 2) direct to the first memory location DATA [0][0]. When processing the previous output pixel (k-1), the part intensity (upper broken line) of its last input-image pixel j=61 was stored. Here the 'full' vertical part-intensities (Xup) of the input pixels 62, 63 belonging to the same output pixel k, and this part intensity of the input pixel 64 are summed in it. The final part is stored in the memory location DATA[0][1] to form a 'seed' for the next pixel sum. Simultaneously, in the processing of each pixel i, the Xdown part intensities were summed in the memory location DATA[1][0] and, in the case of the last one, the longitudinal part intensity in the memory location DATA[1][1], to form a seed for the pixel sum of the following row. After this, the contents of the memory locations DATA[0][0] and DATA[1][0] are summed to the elementary units BUFFER[0][k] and BUFFER[1][k] of the row memories. The first of these form the value Output[l][k] and is taken out.

The following described the pseudocode for implementing scaling by software means.

The output row (l) determines basically, which part of the line memory and the Data memory is used (Data[l mod 2] and Buffer[l mod 2], see pseudocode). The number (k) of the output pixel determined the actual memory location (Data[l mod 2] [k mod 2] and Buffer[l mod 2] [k]). In this case, the term 'X mod 2' refers to X modulo 2, i.e. the remainder X when dividing by 2. The memory locations are automatically alternated by taking the least significant bit of the binary integer index as the address.

The following pseudocode depicts how the line-memory structure is exploited.

We use the following notations:
Input pixel: Input[j][i],
Output pixel: Output[l][k],
Weighting coefficients:

$$w_{end}(k) = FRACTION[(k+1) * M_1/M_2]$$

FRACTION is a fraction $$v_{end}(l) = FRACTION[(l+1) * N_1/N_2]$$

$M_1$, $M_2$: number of pixels in the row
$N_1$, $N_2$ number of rows
$Sx_1$, $Sx_2$, $Sy_1$, $Sy_2$: size of pixels
Scaling factor ScaleFactor (as above)

$$w_{start}[k+1] = 1 - w_{end}[k] (= w_{start}/Sx_1[0,1]),$$

$$v_{start}[l+1] = 1 - v_{end}[l]$$

For the type of pixel row, the value (=KA) is calculated for the statement ((l+1)×$N_1$/$N_2$-j), unless the row in question is the final row (index j=$N_1$-1). If KA>1, the row is a full row and in the case KA<1 it is a part row. If KA=1, the row is the final row for the relevant output row. The memory recitation commands have been omitted. Each memory location is always reset, when data is forwarded.

Processing of a Full Pixel Row

Full Pixel

Data[$l$ mod 2][$k$ mod 2]=Data[$l$ mod 2][$k$ mod 2]+Input[$j$][$i$]

Final Pixel

Data[$l$ mod 2][$k$ mod 2]=Data[$l$ mod 2][$k$ mod 2]+Input[$j$][$i$]

Buffer[$l$ mod 2][$k$]=Buffer[$l$ mod 2][$k$]+Data[$l$ mod 2][$k$ mod 2]

Part Pixel

Data[$l$ mod 2][$k$ mod 2]=Data[$l$ mod 2][$k$ mod 2]+Input[$j$][$i$]×$w_{end}$[$k$]

Data[$l$ mod 2][($k$+1) mod 2]=Input[$j$][$i$]×$w$start[$k$+1]

Buffer[$l$ mod 2][$k$]=Buffer[$l$ mod 2][$k$]+Data[$l$ mod 2][$k$ mod 2]

Processing of the Final Pixel Row:

Full Pixel

Data[$l$ mod 2][$k$ mod 2]=Data[$l$ mod 2][$k$ mod 2]+Input[$j$][$i$]

Final Pixel

Data[$l$ mod 2][$k$ mod 2]=Data[$l$ mod 2][$k$ mod 2]+Input[$j$][$i$]

Buffer[$l$ mod 2][$k$]=Buffer[$l$ mod 2][$k$]+Data[$l$ mod 2][$k$ mod 2]

Output[$l$][$k$]=Buffer[$l$ mod 2][$k$]/ScaleFactor

Part Pixel

Data[$l$ mod 2][$k$ mod 2]=Data[$l$ mod 2][$k$ mod 2]+Input[$j$][$i$]×$w_{end}$[$k$]

Data[$l$ mod 2][($k$+1) mod 2]=Input[$j$][$i$]×$w_{start}$[$k$+1]

Buffer[$l$ mod 2][$k$]=Buffer[$l$ mod 2][$k$]+Data[$l$ mod 2][$k$ mod 2]

Output[$l$][$k$]=Buffer[$l$ mod 2][$k$]/ScaleFactor

Processing of a Part Pixel Row:

$X$up=Input[$j$][$i$]×$v_{end}$[$l$]

$X$down=Input[$j$][$i$]×$v_{start}$[$l$+1]

Full Pixel

Data[$l$ mod 2][$k$ mod 2]=Data[$l$ mod 2][$k$ mod 2]+$X$up

Data[($l$+1) mod 2][$k$ mod 2]=Data[($l$+1) mod 2][$k$ mod 2]+$X$down

Final Pixel

Data[$l$ mod 2][$k$ mod 2]=Data[$l$ mod 2][$k$ mod 2]+$X$up

Data[($l$+1) mod 2][$k$ mod 2]=Data[($l$+1) mod 2][$k$ mod 2]+$X$down

Buffer[$l$ mod 2][$k$]=Buffer[$l$ mod 2][$k$]+Data[$l$ mod 2][$k$ mod 2]

Buffer[($l$+1) mod 2][$k$]=Buffer[($l$+1) mod 2][$k$]+Data[($l$+1) mod 2][$k$ mod 2]

Output[$l$][$k$]=Buffer[$l$ mod 2][$k$]/ScaleFactor

Part Pixel

Data[$l$ mod 2][$k$ mod 2]=Data[$l$ mod 2]+$X$up×$w_{end}$[$k$]

Data[$l$ mod 2][($k$+1) mod 2]=$X$up×$w_{start}$[$k$+1]

Data[($l$+1) mod 2][$k$ mod 2]=Data[($l$+1) mod 2][$k$ mod 2]+$X$down×$w_{end}$[$k$]

Data[($l$+1) mod 2][($k$+1) mod 2]=$X$down×$w_{start}$[$k$+1]

Buffer[$l$ mod 2][$k$]=Buffer[$l$ mod 2][$k$]+Data[$l$ mod 2][$k$ mod 2]

Buffer[($l$+1) mod 2][$k$]=Buffer[($l$+1) mod 2][$k$]+Data[($l$+1) mod 2][$k$ mod 2]

Output[$l$][$k$]=Buffer[$l$ mod 2][$k$]/ScaleFactor

Bayer Image Format

Figure 6:
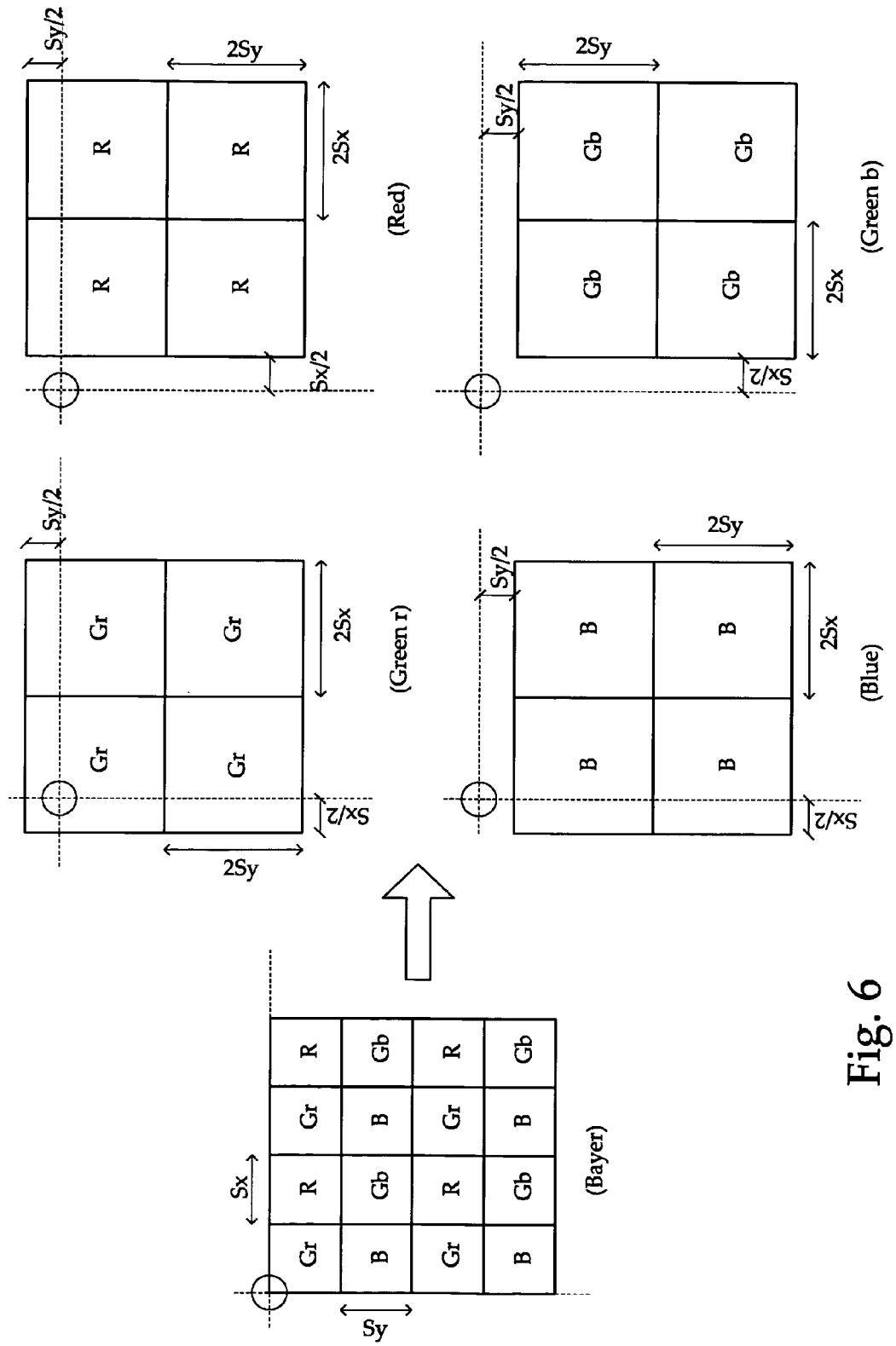
FIG. 6 shows the raw-Bayer image format and its scaling geometry

Scaling can be performed directly from a Bayer format (FIG. 6). In a Bayer image, there is only one colour component in one pixel. The sampling frequency of the colour components (R, $G_R$, $G_B$, and B) is half of the sampling frequency of the pixels. Thus, the scaling factor for the colour components is twice that of the scaling factor $M_2/M_1 \times N_2/N_1$ between the input and output images, when scaling from a Bayer format to the co-sited RGB format. The scaling factor can be stated in the more general form $f \times M_2/M_1 \times N_2/N_1$, in which f is the factor creating the format conversion. More specifically, the factor $f=f_M \times f_N$, i.e. it too can be divided into horizontal and vertical components. If the format does not change in scaling, then the value of f will be 1 (e.g., scaling from a Bayer format to a Bayer format).

The origin is marked in the figure with a circle in the original format and in the input pixels of each colour. If, due to the offsets of the input image, pixel data does not exist for the entire area, then in that case it is advantageous to extrapolate slightly more the value of the previous pixel, so that there will be no need to alter the total scaling ratio in different ways for the edge pixels. Examples of the scaling of different formats are given below.

The offset of the output image can be implemented using simple counters or adjusting the different colour components to be the same. This means that the output image is offset relative to the input image. In practice, this means that part of the information of the edge pixels of the input image are left unused while correspondingly additional information must be extrapolated at the opposite edge.

Figure 7:
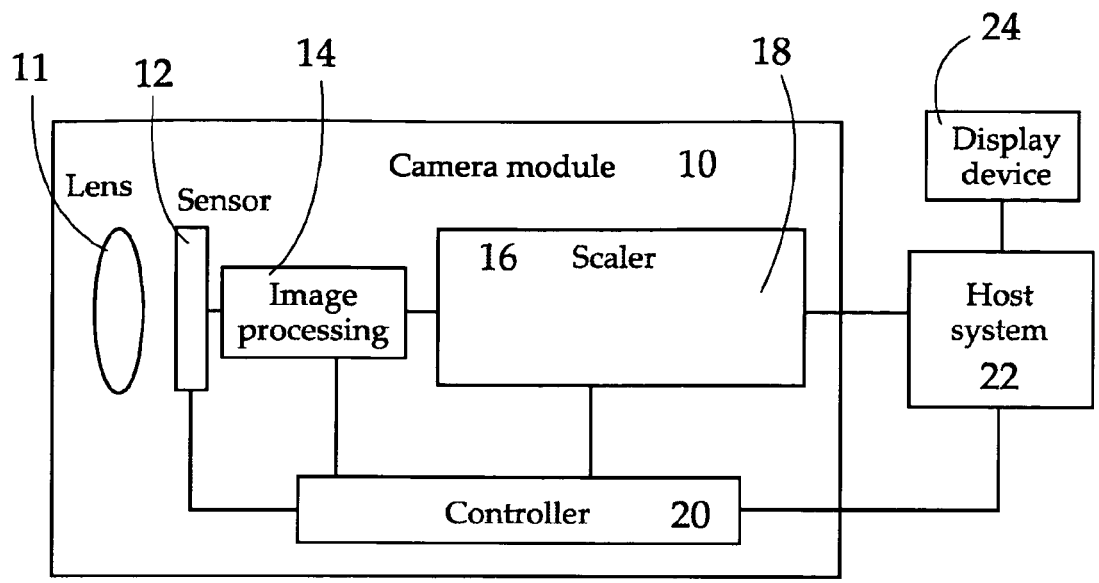
FIG. 7 shows one apparatus solution as a block diagram

The invention is particularly suitable for hardware-based applications, one example of which is the application according to FIG. 7. The camera module 10 is connected to a host system 22, which controls the display device 24 and the camera module. The camera module 10 includes particularly optics, i.e. a lens arrangement 11 (in practice several lenses), a sensor 12, an image-processing circuit 14, a scaling unit 16, and a controller component 20. The image-processing circuit 14 reads, in a known manner, the sensor 12, so that a high-speed data stream is created, which is led to the scaling component 16, from which the data stream of the scaled image is led to the host system 22.

In this case, the memory requirement is about two input-image lines. This means, for example, C×2×160 words in a 160×120 matrix, in which C is the number of colour components (generally 3—for RGB or YUV images). The length of the data word depends on the precision of the calculation and is, for example, 2 or 4 bytes.

Figure 8:
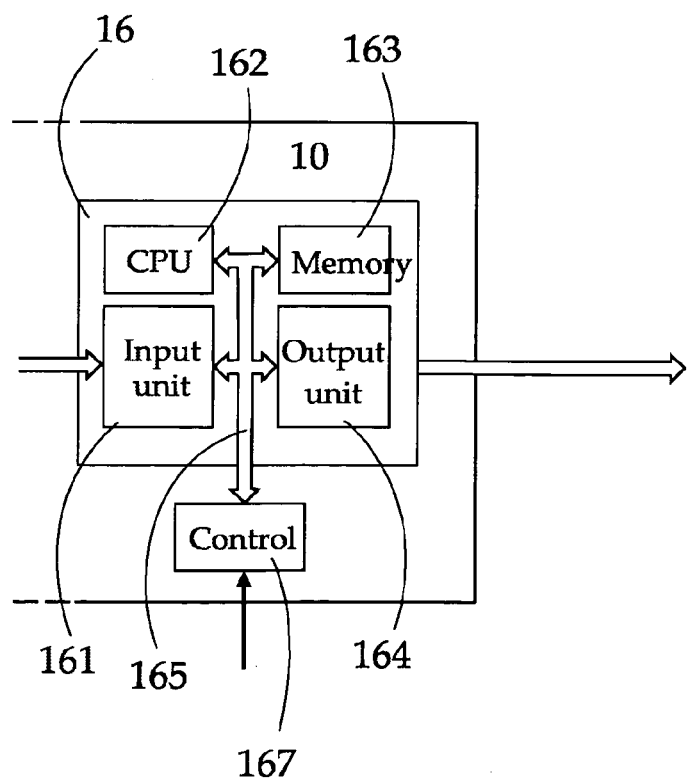
FIG. 8 shows the scaling solution of FIG. 7 at the circuit level

At the circuit level, the structure of the scaler is in one (fully digital) application according to FIG. 8. The scaler 16 includes an input component 161, a CPU 162, a memory 163, an output component 164, and a control component 167, all connected to an internal bus 165. This output component 164 feeds the scaled output pixel values (Output[l][k]) to the host system 22.

The apparatus can include a scaler component, in which there are separate processors (CPUs) for scaling in each dimension (for example, the aforementioned ADSP-BF561). The memory can be memory that is physically inside the processor.

In one application (scaling ratio less than ½), the apparatus includes memory for the scaling function for at most one image sensor line for each colour component.

The apparatus is highly suitable for a mobile terminal.

The following are various alternative implementations of the invention. If there are two devices in the system (a camera module and the host system), the scaler can be implemented in very many different places and in many different ways.

1. The sensor image is processed and scaled by the module and is then sent to the host system (FIG. 7).
2. The sensor image is scaled and processed by the module and then sent to the host system.
3. The sensor image is processed by the module and is then sent to the host system, in which it is scaled.
4. The sensor image is scaled by the module and then it is sent to the host system, in which it is processed.
5. The sensor image is sent to the host system, in which it is scaled and processed.
6. The sensor image is sent to the host system, in which it is processed and scaled.

Scaling can always also be carried out in the display device, provided it has a processing capacity. In addition, the image need not come directly from the sensor/camera module, but instead it can also be read from the memory/memory card. The image can also be compressed (e.g, JPEG), in which case encoding is performed first, followed by scaling. These stages too (decoding and scaling) can be combined. In addition, situations can also be found, in which the scaling can be carried out in two parts, in such a way that first of all the image is scaled in the horizontal direction by the camera module and then sent to the host system, in which it is scaled in the vertical direction and then processed. In addition, the scaler can be used in several (2) different stages, so that this small-memory scaler replaces the previous implementation of the scaler. In addition, the scaler can be used in such a way that a small image is rapidly formed on the display (using simple processing), and only then is the actual larger output image processed. If scaling takes place in the camera module, the host system must of course tell what size of image is required on the display. In addition, scaling may also be required in situations, in which a video image is stored in the memory through a video encoder. In addition, during storing it may be possible to view a viewfinder image on a differently sized display. Thus, situations can be found, in which the video encoder and not the display determines the output image. Similarly, there may be a need to use the same kind of scaler at two different ratios, either sequentially or in parallel, for different purposes.

According to FIG. 9a, the colour components Gr and Gb, like R and B, are processed as totally separate components, which can then be finally combined. According to FIG. 9a, initially four separate components are processed, which form the elementary units of the scaled image directly in the Bayer format. When the output information is cosited R, G, and B (FIG. 9b), the two G components are combined into a single G component. (It is not essential to combine them when scaling to co-sited, but this is often worth doing, in order to minimize the amount of data to be sent.) In order to keep the overall logic of the scaler simple, the G components are processed separately. Thus the component order is always retained in scaling (=the order of the incoming data is the same as the order of the outgoing data). It is important only to know that the question is of a Bayer as an input image. It should also be known whether the output image is Bayer or co-sited, so that the correct offsets (and scaling factors) will be used. This concerns other colour formats as well, such as YUV and RGB. The order of the output components will only change if a switch is made to a different sub-sampling (e.g., from YUV4:2:2 to YUV4:4:4), or a change, e.g., from an interleaved format to a progressive format takes place while scaling.

Because scaling can perfectly well be performed separately (first in the x direction and then in the y direction), and because scaling can only be performed in one direction, it is sometimes clearer and simpler to consider the scaling factors only in one direction.

In certain image formats (YUVx:x:x, Bayer RGB, co-sited RGB, etc., interleaved/planar formats) the pixel data is read from a data flow, a memory, or somewhere else, in a pre-defined order, or correspondingly the pixel data is written to a data flow, memory, or somewhere else in a predefined order. In FIGS. 10a-10e, this data flow is marked 'INPUT data order' or 'OUTPUT data order'. In the data order, the size of the pixel is of no importance, but for reasons of clarity the pixels are drawn in the figures according to the scaling ratio.

In scaling according to the patent application, it is, however, important to know the positions and areas of the pixels (FIG. 1 and FIG. 2). The generally known image formats also define the positions and areas of the pixels and these are marked 'INPUT pixel positions' or 'OUTPUT pixel positions' in FIGS. 10a-10e. The scaling geometry is intended to match the input and output pixels with each other (according to FIGS. 1 and 2).

The broken line on the left-hand side in the figures refers to the origin, point (0, 0). Generally, the term origin refers to the left-hand upper corner of the image. In FIGS. 10a-10e, a few of the first pixels are shown, starting from the origin.

In the following images $S_1=Sx_1$ or $S_1=Sy_1$, and $S_2=Sx_2$ or $SY_2$ (as in FIG. 2) according to the situation. $S_1$ and $S_2$ refer to the size of the pixels.

Figure 10A:
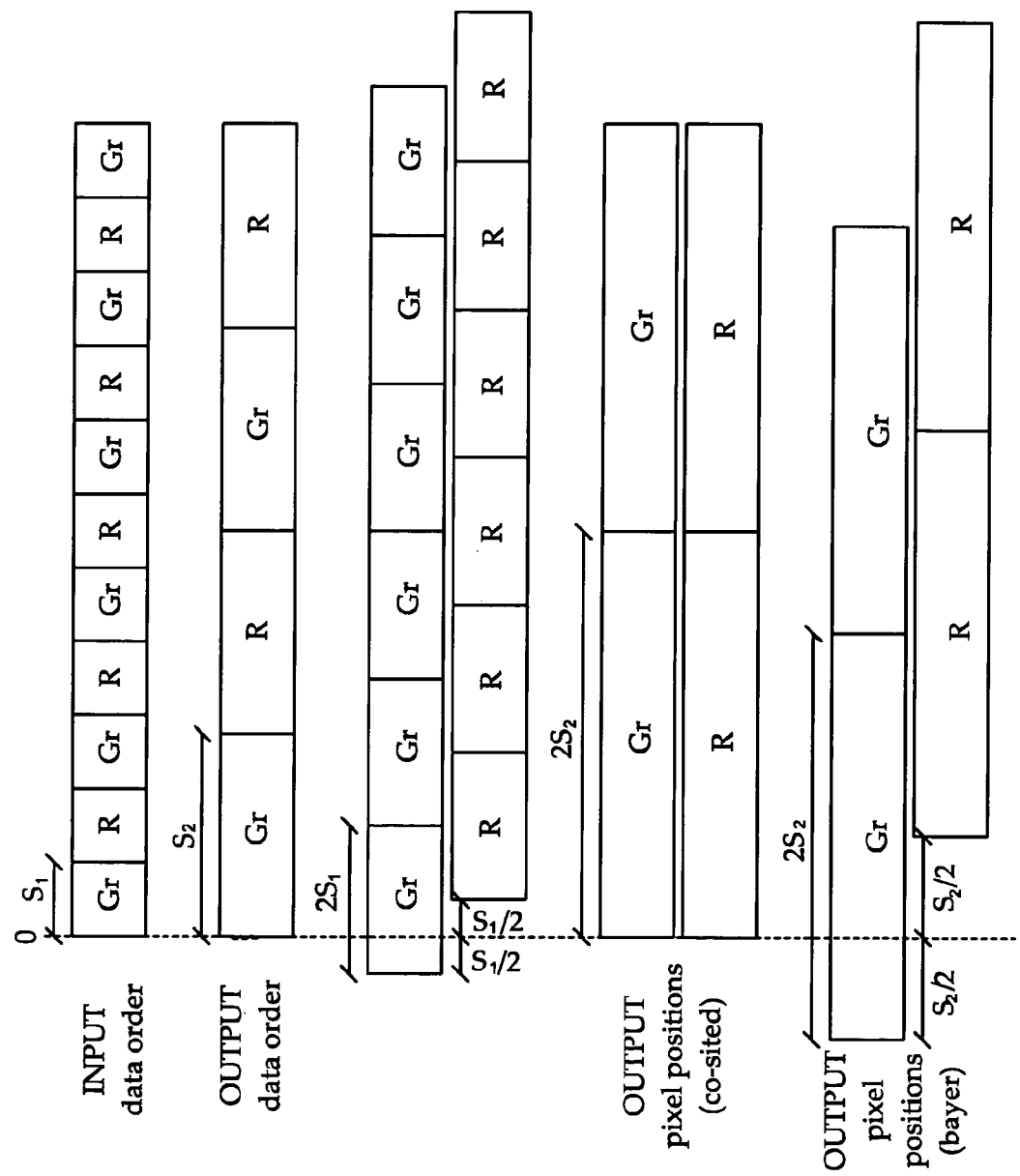
FIG. 10*a* shows downscaling of the Bayer format to two different formats (co-sited RGB and Bayer)
Figure 10B:
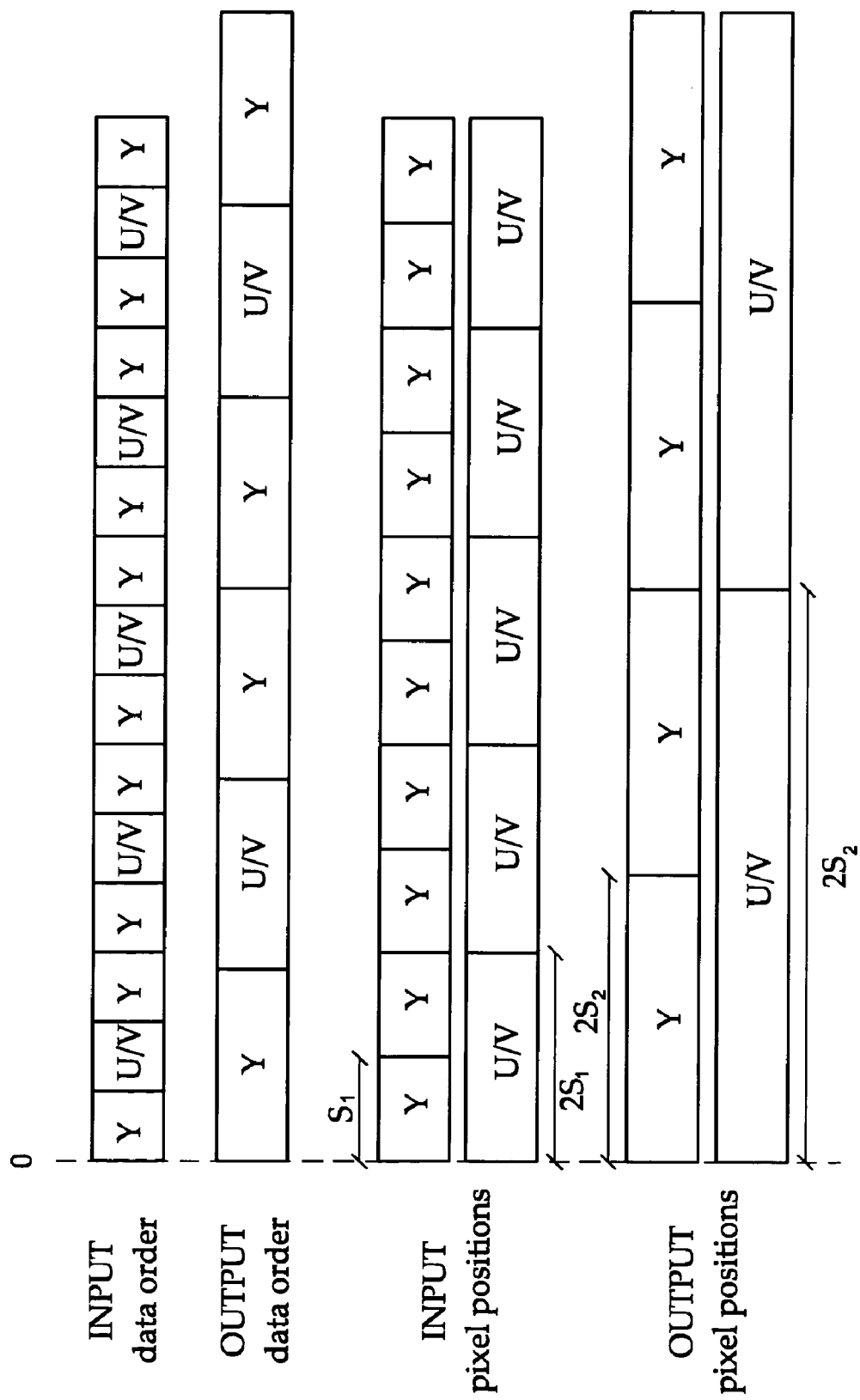
FIG. 10*b* shows downscaling of the YUV 4:2:0 (H) format.
Figure 10C:
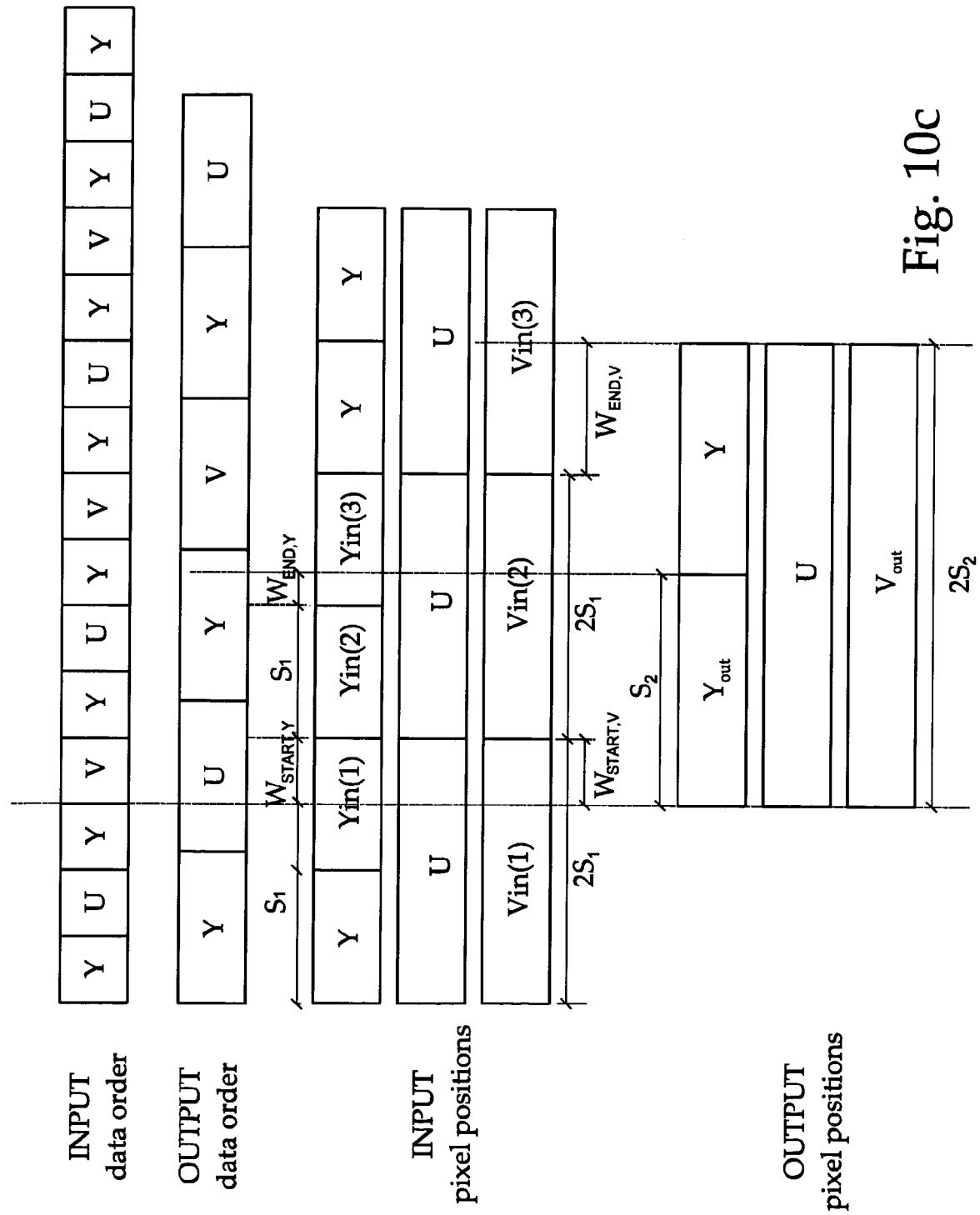
FIG. 10*c* shows downscaling of the YUV 4:2:2 (H) format, for an individual pixel.
Figure 10D:
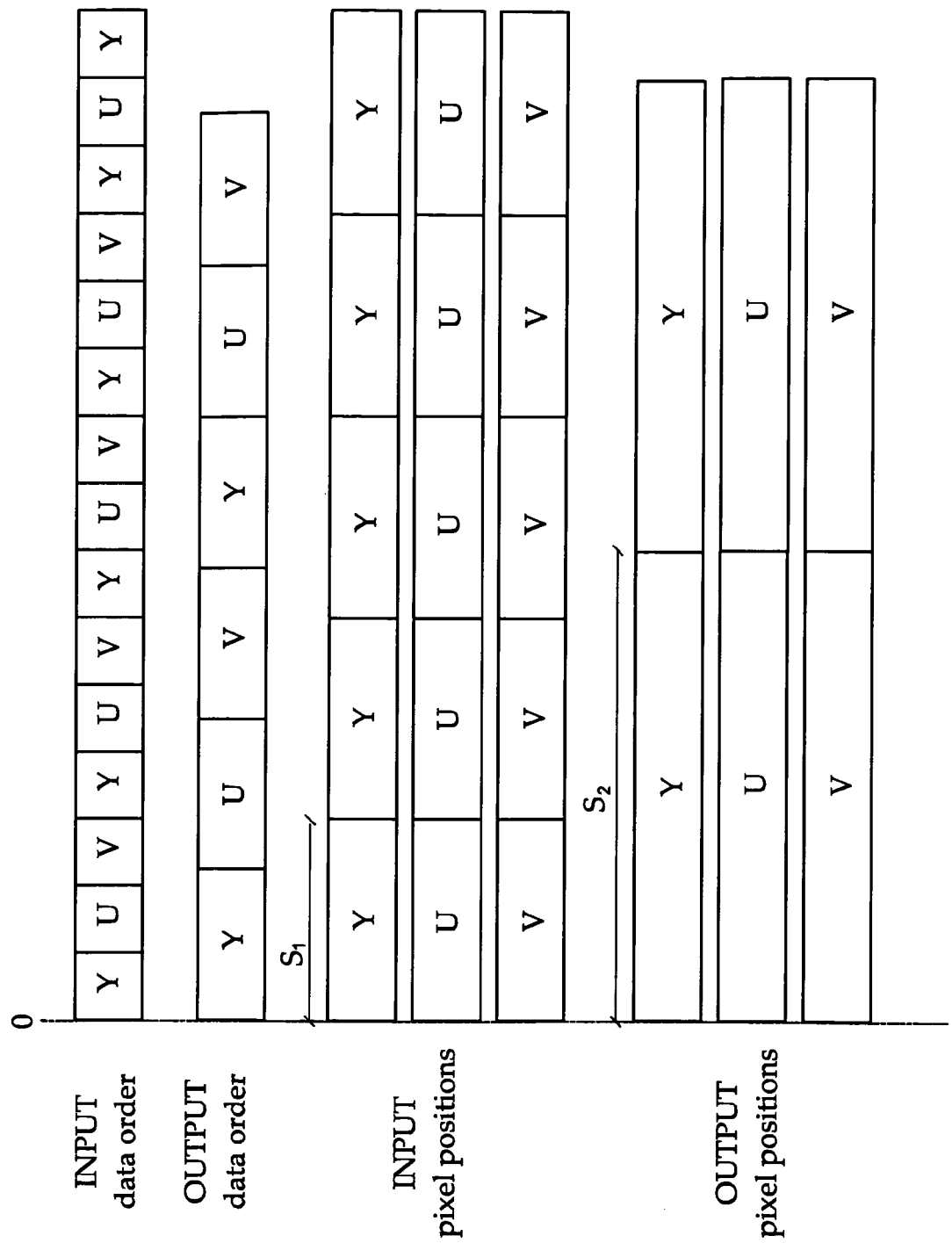
FIG. 10*d* shows downscaling of the YUV 4:4:4 (H) format.
Figure 10E:
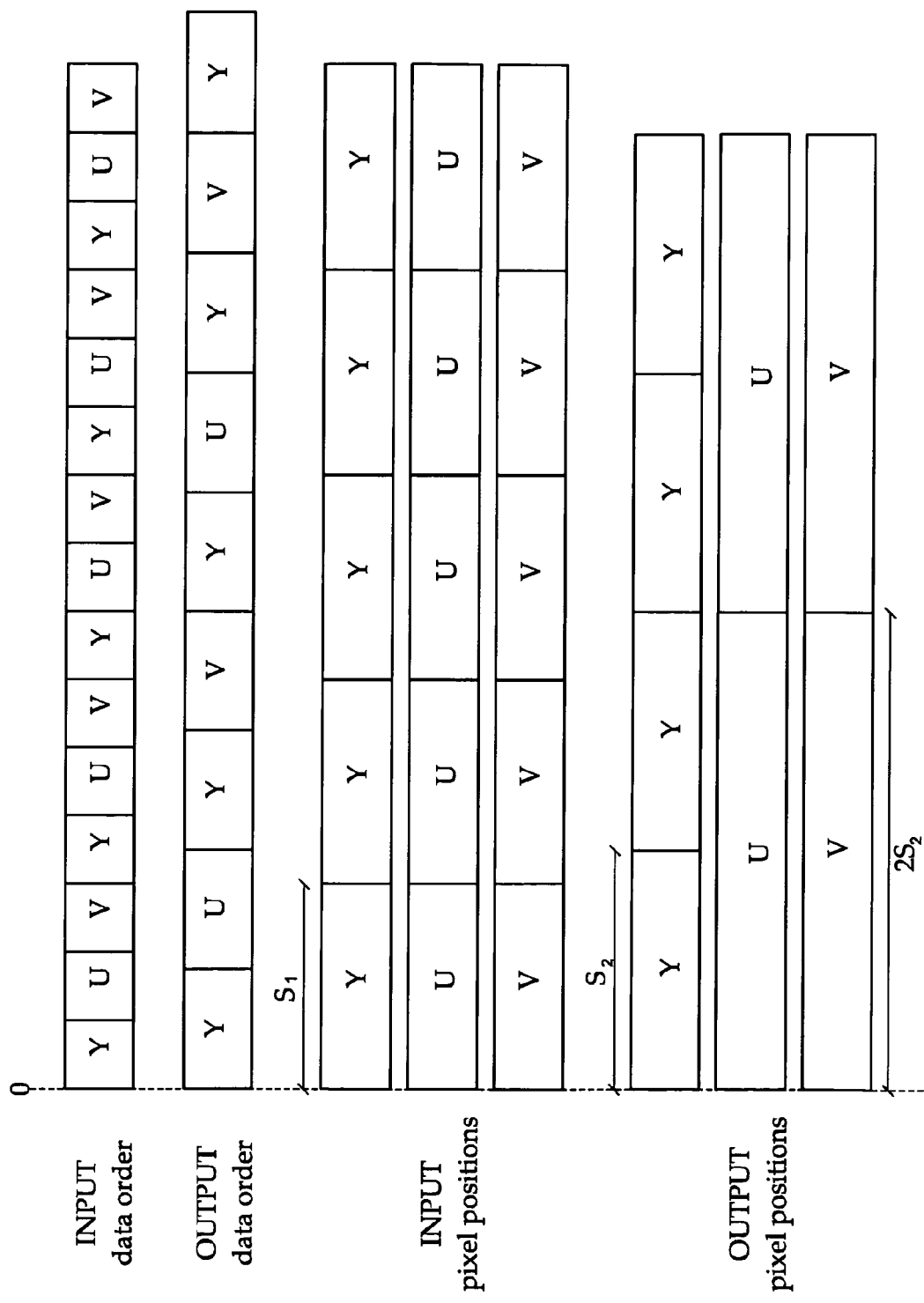
FIG. 10*e* shows downscaling of the YUV 4:4:4 format to a different format YUV 4:2:2.

FIG. 10a shows the same Bayer-image scaling geometry as FIG. 6. Due to the construction of a Bayer-image sensor, the colour components have their own well-defined position. Due to this, the colour components are moved suitably relative to the origin (in the image by the amount $S_1/2$, $S_2/2$, Sx/2, or Sy/2), so that the information of the colour components will also match each other. In this figure, the question is of Bayer to co-sited RGB and Bayer-to-Bayer scaling. In this case, it should be noted that when an image is scaled to the Bayer format, the image obtained after scaling can be interpolated, by CFA interpolation, to the size indicated by the number of pixels. When scaling to co-sited format, CFA interpolation is not required, by size of the output image is halved from the number of pixels after scaling by finally combining the components. If the resolution of the initial image is thus, e.g., 1600×1200 pixels and the scaling factor $S_1/S_2$ is 0.5 (=½) in both directions, then the size of the output image of Bayer scaling will be 800×600 pixels, from which an output image of a size 800×600 can be interpolated. Correspondingly, when scaling to co-sited format, the size of the scaling output image will also be 800×600, from which a (4×)400×300-sized output image can be created. Correspondingly, if, in the co-sited format, the G-components are combined, then the size of the output image after scaling would be (3×)400×300 (i.e. 25% fewer pixels than without combining). This leads to the doubling of the scaling factor referred to earlier. Thus the real scaling factor $S_2/S_1$ is actually $2\times(S_2/S_1)$, that is, if this is compared using the ratios of the sizes of the output images created (i.e. for example, the scaling factor for a co-sited image is in practice, in both the x and the y direction 1/scale-factor=0.25=400/1600=300/1200). Thus, this does not affect the scaling factor and calculations during the actual scaling, but only the ratios of the output images.

FIG. 10$b$-$c$, $e$. In the formats YUV4:2:0 and YUV4:2:2, the sampling frequency of the U and V components is half the sampling frequency of the Y component, in which case the size of a U or V pixel will be two times ($2S_1$) the size ($S_1$) of a Y pixel. In the YUV4:1:1 format, the sampling frequency of a U or V component is one-quarter of the sampling frequency of a Y component, so that correspondingly the size of a U or V pixel will be fours time the size of a Y pixel.

FIG. 10$b$. In the YUV4:2:0 format, only either the U or the V component is stored on each line. Thus a YU line or YV line can be processed in the same way. The notation U/V means that the pixel can be either a U pixel or a V pixel per line.

FIG. 10$c$ shows the processing of an individual pixel somewhere in the middle of the scaling of the image YUV 4:2:2 (H). The scaling YUV 4:2:2->YUV 4:2:2 vertical is the same as YUV 4:4:4->4:2:2.

In this case, the values of the output pixels are calculated as follows:

$$Y\text{out}=[W_{START.Y}\cdot Y\text{in}(1)+S_1\cdot Y\text{in}(2)+W_{END.Y}\cdot Y\text{in}(3)]/S_2$$

$$V\text{out}=[W_{START.V}\cdot V\text{in}(1)+2S_1\cdot V\text{in}(2)+W_{END.V}\cdot V\text{in}(3)]/2S_2 \text{ (and } U \text{ as for } V)$$

FIG. 10$d$ shows YUV 4:4:4->YUV 4:4:4 scaling. (Co-sited RGB scaling is the same as YUV 4:4:4, if R, G, and B are written in place of Y, U, and V.)

FIG. 10$e$ shows YUV 4:4:4->YUV 4:2:2 scaling.

A simultaneous sub-sampling variation and suitable scaling can be easily derived from the above examples. An example of this would be YUV 4:2:0 to YUV 4:4:4 conversion, in which scaling takes place by 0.5 in both the X and the Y direction. In that case, only the Y component need be scaled while the colour components remain unchanged.

By using this method, the same advantages as in other image scaling can be obtained is in scaling a Bayer image. This are the correct use of the image information and the best possible filtering. In addition, Bayer scaling will substantially reduce the total calculation requirement and data traffic between processing. The method described to scale all components separately also brings the advantage that the precise order of the colour components need not be known in the scaler and thus, for example, image rotations, mirrorings, or sensor readings in different directions can be taken care of easily, without having to alter the scaler or its operation. In addition, when using different offsets and component settings, the scaler can be used for scaling very different kinds of colour-image information, and also for creating different kinds of output format. It can also be used to generate, for example, either Bayer or co-sited output images as required.

The invention claimed is:

1. A method comprising, with use of a processor:
   downscaling a digital coloured matrix image by selected ratios $M_2/M_1$ and $N_2/N_1$, in which the matrix image includes $N_1$ rows, each row including $M_1$ pixels, so that the values of the pixels form the matrix and the pixels of different colours form the selected format, and
   using scaling to form an output matrix, of a size $M_2\times N_2$, the pixels corresponding to sub-groups of the original matrix, in such a way that $M_2<=M_1$ and $N_2<=N_1$, and from the values Input(j,i) of which pixels (i,j) the value Output(l,k) of each output pixel (k,l) of the output matrix is calculated,
   forming the weighted sums of the values of the same-colour pixels (i,j) of the matrix image in the area of each output pixel (k,l) parallel in line memories arranged for each colour,
   calculating for each input pixel a weighting coefficient representing the dimension share of the pixel (i,j) in the area of the output pixel (k,l), and
   correcting each weighted sum by a scaling factor.

2. A method according to claim 1, wherein the scaling is carried out in one dimension at a time, by calculating the intermediate sums Outx(l) of this dimension in a memory location by forming the weighted sum of the intensities of the pixels of this dimension, the weighting coefficients being the proportion of each source pixel (i,j) in this dimension's output pixels (k,l) and by transferring the sum finally to the line memory, to each elementary unit (l) of which the intermediate sums Outx(l) of the output pixel (k,l) of the corresponding column (k) are calculated.

3. A method according to claim 2, wherein the calculation is performed by using alternating pairs of memory locations and alternating pairs of line memory, in such a way that
   in the case of a part pixel (i.j), the initial part intensity of the following output pixel (k+1,l) is also always calculated to a second memory location, in which the summed intensity of the subsequent index (k+1) is in turn collected, and
   in the case of a part row, the intensity value of each pixel (i,j) is divided between both memory locations, in proportion to how the pixel covers the output pixel (k, l) and the following output pixel (k, l+1) in the corresponding dimension and is summed over the length of the output pixel and each first sum is stored in the next row buffer in turn and the second sum is stored in the second row buffer ((l+1)mod 2), in which the sums of the following output row (l+1) are begun to be collected.

4. A method according to claim 1, wherein the output image is moved relative to the input image, in such a way that part of the information of the edge pixels of the input image is left unused and correspondingly, at the opposite edge, additional information is extrapolated to the input pixels.

5. A method according to claim 1, comprising:
   forming said weighted sums by using an alternating pair of line memories arranged for each colour, each line memory having the width of an output image.

6. An apparatus for downscaling a digital coloured matrix image by selected ratios, which the apparatus includes an application memory for storing and processing the scaled matrix image, a central processing unit, a program memory area and a program stored into for performing the processing, and in which the matrix image includes $N_1$ rows, each row including $M_1$ pixels, so that the values of the pixels form the matrix and the pixels of different colours form the format, and in which the pixels of the output matrix, of a size $M_2\times N_2$, formed by the scaling, correspond to sub-groups of the original matrix, from the values of which pixels the mean value of each pixel of the output matrix is calculated by calculating the sum of the values and dividing it by the scaling factor, wherein the apparatus is configured to process the input pixels (k,l) individually, in such a way that the said sum of the values is formed parallel in line memories arranged for each colour weighted from the values of the same-colour matrix-image pixels (i,j) in the area of each output pixel (k,l), the weighting coefficient being the dimension proportion of the pixel (i,j) in the area of the output pixel (k,l).

7. An apparatus according to claim 6, wherein the memory area includes four memory locations for each colour and two line memories for each colour and that the apparatus is arranged to perform scaling in one dimension at a time, by calculating the intermediate sums Outx(l) of this dimension into a memory location by forming the weighted sum of the intensities of the pixels of this dimension, the weighting factors being the proportion of each source pixel (i,j) in the output pixels (k,l) of this dimension and to transfer the sum finally to the line memory, the intermediate sums Outx corresponding to one calculated output pixel row (l) being arranged in each elementary unit (k).

8. An apparatus according to claim 7, wherein it includes an alternating pair of memory locations and an alternating pair of line memories, to which address means are linked, which are arranged using the least significant bit of the functioning binary-form index (k, l), in such a way that
    in the case of a part pixel (i,j), the initial part intensity of the following output pixel (k+1,l) is also always calculated into a second memory location, in which the sum intensity of the following index (k+1) is in turn collected, and
    in the case of a part row, the intensity value of each pixel (i,j) is divided between both memory locations, in proportion to how the pixel covers the output pixel (k, l) and the following output pixel (k, l+1) in the corresponding dimension, and the part values are summed and stored over the length of the output pixel in the line memories.

9. An apparatus according to claim 7, wherein the apparatus includes a scaler component, in which there are separate processors for scaling in each dimension.

10. An apparatus according to claim 6, wherein the apparatus is integrated in connection with the camera sensor of the camera.

11. An apparatus according to claim 10 and including a host system, wherein scaling in one dimension is integrated in connection with the camera sensor of the camera and the scaling in the other dimension with the host system.

12. An apparatus according to claim 6, wherein the apparatus includes memory for the scaling operations of at least two output-image lines for each colour component.

13. An apparatus according to claim 6, wherein the memory required in scaling is implemented in the processor.

14. An apparatus according to claim 6, wherein the apparatus is arranged in a mobile terminal.

15. An apparatus according to claim 6, wherein said sum of the values is formed by using an alternating pair of line memories arranged for each colour, each line memory having the width of an output image.

16. A method comprising, with use of a processor: downscaling a digital matrix image, by means of software, by selected ratios $M_2/M_1$ and $N_2/N_1$, in a digital device, in which there is a scaling component including at least an input unit for bringing the input rows to the scaling component, a processor and memory for processing the data, and an output part from forwarding the processed data, and in which the matrix image includes $N_1$ rows, each row including $M_1$ pixels, so that the values of the pixels form the matrix and the pixels of different colours form the selected format, and in which the pixels of the output matrix, of a size $M_2 \times N_2$, formed by scaling, correspond to the sub-groups of the original matrix, in such way that $M_2 < M_1$ and $N_2 < N_1$, and from the values Input (j,i) of which pixels (i,j) the value Output(l,k) is calculated for each output pixel (k,l) of the output matrix, wherein
    the coloured matrix image is read only once so that each input row is brought in turn, and each pixel is taken individually to the processor for processing,
    the weighting coefficient for each pixel is calculated in the area of the output pixel, the weighting coefficient depicting the part of the surface area of the pixel in the output pixel,
    the values of the pixels of the input row are summed in the area of each output pixel (k,l) according to a predefined sequence, in such a way that a weighted sum is formed parallel in line memories arranged for each colour and each sum is formed of the values of the same-colour matrix-image pixels (i,j) in the area of each output pixel (k,l), and each weighted sum is corrected by a scaling factor,
    the corrected sum is transferred out through the output part.

17. A method according to claim 16, wherein the memory includes at least two pairs of memory locations for summing the intensities and two line memories, and in which
    the relationship of the input line j to the output line l is defined and
    the intermediate sums Outx(i,l) in the selected dimension are calculated to the memory location Data[k mod 2] that is now in turn and the final part of the part pixel to the second memory location (Data[(k+1)mod 2]) and the sum is finally transferred to the line memory, to each elementary unit (l) of which the intermediate sums Outx (i,l) of the output pixel (k,l) of the corresponding column (l) are calculated.

18. A method according to claim 17, wherein
    the memory locations of the pair of memory locations and the line memories of the pair of line memories are addressed with the aid of an alternating function,
    in the case of a part pixel (i,j) the initial part intensity of the following output pixel (k+1,l) is always also calculated and is stored in the second memory location, in which the sum intensity of the index (k+1) following in turn is collected, and
    in the case of a part row, the intensity value of each pixel (i,j) is divided and stored in both memory locations in proportion to how the pixel and the following pixel (k,l+1) cover the output pixel (k, l) in the corresponding dimension (y), and are summed over the length of the output pixel and the first sum of each is stored in the line memory now in turn and the second sum in the second line memory ((l+1)mod 2), in which the sums of the following output row (l+1) are begun to be collected.

19. An apparatus comprising:
    means configured to downscale a digital coloured matrix image by selected ratios ($M_2/M_1$ and $N_2/N_1$) to form an output matrix, said digital coloured matrix image including $N_1$ rows, each row including $M_1$ pixels, so that the values of the pixels form the digital coloured matrix and the pixels of different colours form the format, and the pixels of the output matrix, of a size $M_2 \times N_2$, formed by the scaling, correspond to sub-groups of the digital coloured matrix,
    means configured to communicate with an application memory for storing and processing the scaled matrix image, means configured to calculate the mean value of each pixel of the output matrix from the values of pixels by calculating the sum of the values and dividing the sum by a scaling factor, wherein the apparatus is configured to process the input pixels (k,l) individually, in such a way that the said sum of the values is formed parallel in line memories arranged for each colour weighted from the values of the same-colour matrix-image pixels (i,j) in the area of each output pixel (k,l), the weighting coefficient being the dimension proportion of the pixel (i,j) in the area of the output pixel (k,l).

20. An apparatus according to claim 19, wherein said sum of the values is formed by using an alternating pair of line memories arranged for each colour, each line memory having the width of an output image.

* * * * *